(12) United States Patent
Hocking (10) Patent No.: US 8,122,723 B2
(45) Date of Patent: Feb. 28, 2012

(54) ADJUSTMENT ASSEMBLY

(75) Inventor: Barry N Hocking, Solihull (GB)

(73) Assignee: Rolls-Royce PLC, London (GB)

( * ) Notice: Subject to any disclaimer, the term of this patent is extended or adjusted under 35 U.S.C. 154(b) by 1180 days.

(21) Appl. No.: 11/715,343

(22) Filed: Mar. 8, 2007

(65) Prior Publication Data
US 2007/0235080 A1   Oct. 11, 2007

(30) Foreign Application Priority Data
Apr. 5, 2006   (GB) .................................. 0606823.3

(51) Int. Cl.
*F02K 1/18* (2006.01)
(52) U.S. Cl. ........................... 60/771; 60/242
(58) Field of Classification Search .................... 60/262, 60/39.281, 735, 745, 771, 242; 137/84, 85; 239/265.37, 265.39, 265.41, 265.43
See application file for complete search history.

(56) References Cited

U.S. PATENT DOCUMENTS

| | | | | |
|---|---|---|---|---|
| 2,938,335 | A * | 5/1960 | Cook, Jr. ................... | 239/265.13 |
| 2,997,845 | A * | 8/1961 | Oulianoff .................. | 239/265.17 |
| 3,007,304 | A | 11/1961 | Wotton et al. | |
| 3,027,714 | A * | 4/1962 | Parker ........................ | 239/127.3 |
| 4,752,182 | A | 6/1988 | Zaehring et al. | |
| 5,941,065 | A * | 8/1999 | Lidstone et al. ................. | 60/771 |
| 6,167,694 | B1 * | 1/2001 | Davies ......................... | 60/226.2 |
| 6,966,175 | B2 * | 11/2005 | Lair ............................ | 60/226.1 |
| 7,264,203 | B2 * | 9/2007 | Lair ........................... | 244/110 B |
| 7,568,348 | B2 * | 8/2009 | McAllister et al. ............. | 60/771 |
| 2002/0125340 | A1 | 9/2002 | Birch et al. | |

FOREIGN PATENT DOCUMENTS

| | | |
|---|---|---|
| DE | 2 158 625 | 5/1973 |
| GB | 1122910 | 8/1968 |
| GB | 2 374 121 A | 10/2002 |
| WO | WO 2006/055217 A1 | 5/2006 |
| WO | WO 2006/110184 A1 | 10/2006 |

OTHER PUBLICATIONS

European Search Report issued in European Application No. 07250953.2 dated Jan. 21, 2011.

* cited by examiner

*Primary Examiner* — Ehud Gartenberg
*Assistant Examiner* — Vikansha Dwivedi
(74) *Attorney, Agent, or Firm* — Oliff & Berridge, PLC (57) ABSTRACT

A fluid flow control device (26, 28) comprising a guide member (30) to guide a fluid passing through a duct (22, 24, 76), the guide member (30) being movable between first and second positions; and an urging arrangement (32) capable of providing an urging force (F1) to urge the guide member (30) towards the first position, characterised in that the urging arrangement (32) is a resilient torsion bar that is formed so as to allow the guide member (30) to be moved towards the second position by a pressure force (F2) exceeding and opposite to the urging force (F1), the pressure force (F2) being provided by a pressure difference across the guide member (30).

26 Claims, 7 Drawing Sheets

ADJUSTMENT ASSEMBLY

This invention relates to fluid flow control devices for use in gas turbine engines. Embodiments of the invention relate to control devices for adjusting the cross-sectional area of exhaust nozzles of gas turbine engines. Further embodiments relate to controlling the flow through a heat exchanger of a gas turbine engine.

It is known to provide fluid flow control devices or adjustment assemblies to adjust the cross-sectional area of the exhaust nozzle of gas turbine engines. However, known adjustment assemblies are uneconomical, heavy and unreliable, especially for civil engine applications.

According to one aspect of this invention, there is provided a fluid flow control device comprising a guide member to guide a fluid passing through a duct, the guide member being movable between first and second positions; and an urging arrangement capable of providing an urging force to urge the guide member towards the first position, characterised in that the urging arrangement is a resilient torsion bar that is formed so as to allow the guide member to be moved towards the second position by a pressure force exceeding and opposite to the urging force, the pressure force being provided by a pressure difference across the guide member.

In one embodiment, the urging arrangement may be generally circular in configuration to extend around the fluid flow path. A plurality of guide members may be arranged adjacent one another around the urging arrangement.

In another embodiment, the urging arrangement comprises a plurality of resilient members arranged one after the other in an annular arrangement. Each resilient member may have a discrete guide member mounted thereon.

The first position of the guide member may provide a minimum area condition for the fluid path. The second position may provide a maximum area of condition for the fluid path.

The guide member may comprise a tapering member tapering from a wide region adjacent the urging arrangement, to a narrow region spaced from the urging arrangement. Preferably, the guide member tapers inwardly in a downstream direction of the flow of fluid.

A securing arrangement may be provided to secure the guide member to the urging arrangement. The securing arrangement may comprise a clamp. In one embodiment, the securing arrangement may comprise first and second clamps. In one embodiment, a conduit defines the fluid flow path, and a fixing element may be provided to fix the fluid flow control device to the conduit. The fixing element may extend in an upstream direction from the urging arrangement fixing to the conduit. The fixing element may comprise an elongate member.

A stop may be provided to restrict the extent of movement of the guide member when urged towards the first position to provide, in one embodiment, a minimum exit area of a nozzle. A second stop member may be provided to restrict the extent of travel of the guide member when being urged towards the second position, to provide, in one embodiment, a maximum nozzle exit area.

A damper may be provided to inhibit the speed at which the guide member moves between the first and second positions.

The resilient torsion bar may comprise a Shape Memory Material.

According to another aspect of this invention, the assembly comprises fixed and moveable guide members alternately spaced to one another. The guide members have lateral edges that are angled to abut one another to provide positive location in the first or second position.

According to another aspect of this invention, there is provided a nozzle arrangement comprising a nozzle though which a fluid can flow, the nozzle having an outlet, and the arrangement further comprising an fluid flow control device as described above arranged on the nozzle at the outlet. Thus, in one embodiment, the adjustment arrangement can adjust the outlet area of the nozzle between the first and second positions.

In one embodiment, the nozzle arrangement may comprise a plurality of guide members arranged circumferentially around the outlet of the nozzle. Each guide member may be mounted on a common urging arrangement, which may extend around the nozzle.

In another embodiment the nozzle arrangement comprises a plurality of guide members arranged adjacent one another around the urging arrangement. In this embodiment, the fluid flow control device comprises a discrete guide member arranged on a discrete urging arrangement. A plurality of the aforesaid discrete guide members and respective discrete urging arrangements may be circumferentially arranged adjacent one another.

According to another aspect of this invention, there is provided a heat exchanger comprising a first inlet, a first outlet, a second inlet and a second outlet wherein at least one of the inlets and outlets comprises an fluid flow control device as described above.

According to another aspect of this invention, there is provided a gas turbine engine comprising a fan for directing a first flow of air through a first nozzle, and a turbine arrangement for directing a second flow of air through a second nozzle, a first fluid flow control device as described above provided on the first nozzle, and a second fluid flow control device as described above provided on the second nozzle.

The temperatures and pressures of the flows of gas through the first and second nozzle may be different, and the urging arrangement of the first fluid flow control device may be selected to be appropriate for the conditions of a gas flowing through the first nozzle. The second urging arrangement may be selected to be appropriate for the conditions at the second nozzle.

An embodiment of the invention will now be described by way of example only, with reference to the accompanying drawings, in which.

Figure 1:
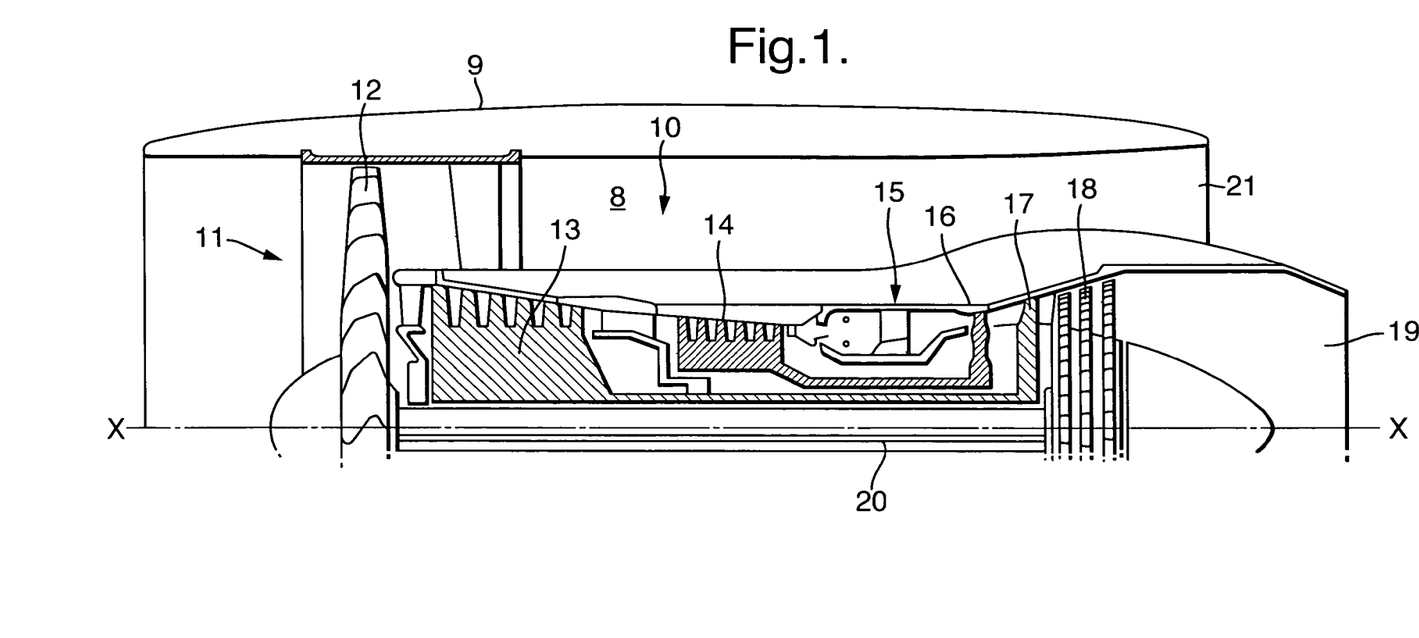
FIG. 1 is a sectional side view of the upper half of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and a variable area core exhaust hot nozzle 19 and a variable area cold bypass nozzle 21. The engine 10 is surrounded by a nacelle 9 which defines a bypass duct 8 and the bypass nozzle 21.

The gas turbine engine 10 works in a conventional manner so that air entering the intake 11 is accelerated by the fan 12 which produce two air flows: a first air flow into the intermediate pressure compressor 13 and a second air flow which provides propulsive thrust through the cold nozzle 21. The intermediate pressure compressor compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbines 16, 17 and 18 before being exhausted through the hot nozzle 19 to provide additional propulsive thrust. The high, intermediate and low pressure turbine 16, 17 and 18 respectively drive the high and intermediate pressure compressors 14 and 13, and the fan 12 by suitable interconnecting shafts 20.

Figure 2:
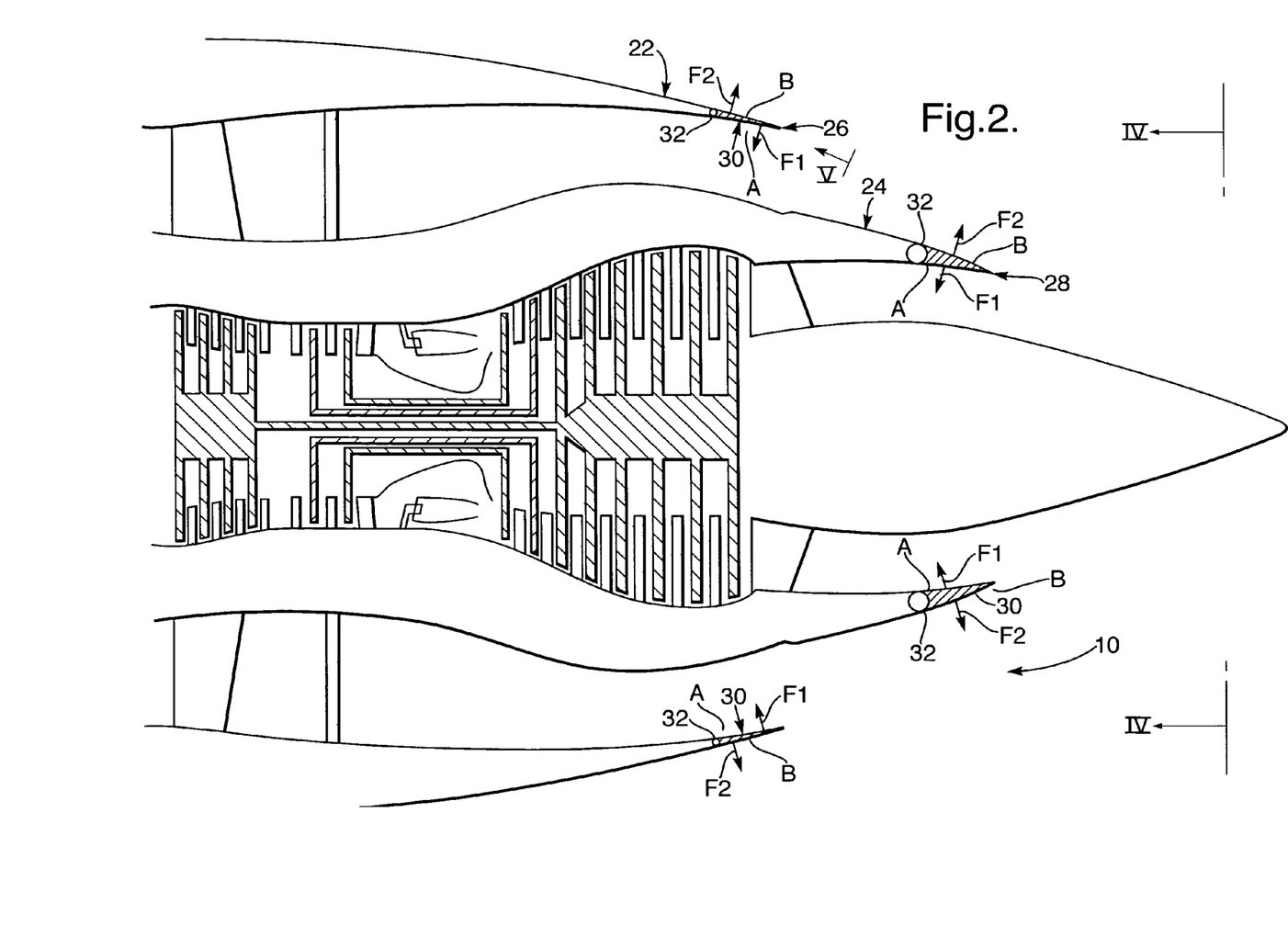
FIG. 2 is a close up view of a rear region of the gas turbine engine shown in FIG. 1.

FIG. 2 shows a close up of the rear region of the engine 10 shown in FIG. 1. FIG. 2 shows an outer cold nozzle 22 and an inner hot nozzle 24. Gas from the fan 12 is exhausted from the engine 10 via the outer nozzle 22. Gas passing through the core of the engine, namely the compressors 13, 14, the combustor 15 and the turbines 16, 17, 18, is exhausted of the inner nozzle 24. The gas leaving via the inner nozzle 24 is hotter than the gas leaving the outer nozzle 22.

As can be seen from FIG. 2, the outer nozzle 22 is provided with an outer fluid flow control device 26, and the inner nozzle 24 is provided with an inner fluid flow control device 28.

Each of the fluid flow control devices 26, 28 comprises a plurality of guide members 30. FIGS. 3, 4, 5, 8 and 9 show five embodiments of the outer fluid flow control device 26, but it will be appreciated that a similar construction is provided for the inner adjustment arrangement 28.

Figure 3:
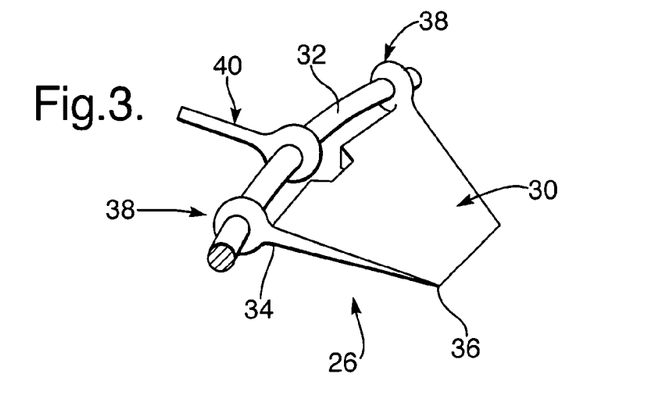
FIG. 3 is a perspective view of an embodiment of a guide member.

Referring to FIG. 3, a guide member 30 is mounted on an urging arrangement in the form of a torsion bar 32. The torsion bar 32 extends circumferentially around the outer nozzle 22, and a plurality of the guide members 30 are mounted thereon adjacent to one another in a circumferential sequence around the torsion bar 32. The torsion bar 32 exerts an urging force F1 on the guide members 30 to urge them to a minimum area, or closed, position, as shown in FIG. 2.

As an aircraft having an engine with a fixed geometry nozzle accelerates to cruise, the difference between the jet velocity and ambient decreases and the engine's efficiency reduces. With a variable area nozzle the reduction in nozzle area between take-off and cruise therefore increases jet velocity and improves engine efficiency. Between take-off and cruise there is a change in pressures of ambient, core (inner) and bypass (outer) fluids such that the relative pressures causing the forces F2 alter to thereby allow movement of the guide members 30.

Each of the guide members 30 of a trapezoidal configuration and tapers in the downstream direction, having a thicker edge 34 adjacent the torsion bar 32 and a thinner edge 36 spaced from the torsion bar 32. Each of the guide members 30 is fixedly mounted to the torsion bar 32 by clamping arrangements 38.

An elongate fixing member 40 secures the torsion bar 32 in the region of each guide member 30 to the main body of the nozzle.

Figure 4:
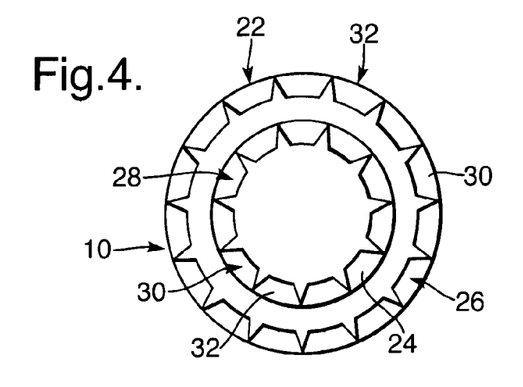
FIG. 4 is a view along the lines IV-IV in FIG. 2.

Referring to FIG. 4, the inner and outer nozzle adjustment arrangements 26, 28 can be seen viewed on the line IV-IV of FIG. 2. The guide members 30 are arranged around the core (inner) and bypass (outer) nozzle torsion bars 32 and are shown projecting into the exhaust gas streams to give a minimum nozzle area configuration particularly suitable for aircraft cruise. During take-off the pressure difference is such that the guide members 30 are forced radially outwardly to increase the nozzle area. The mean velocity of the working fluid decreases, relative to a fixed geometry nozzle, thereby reducing jet noise generated in a turbulent shear layer between adjacent jets and ambient. A decrease in relative jet velocities has a corresponding decrease in jet noise. Jet noise is further reduced as vortices are generated from the guide members 30, which enhances mixing of the shear layers.

Figure 5:
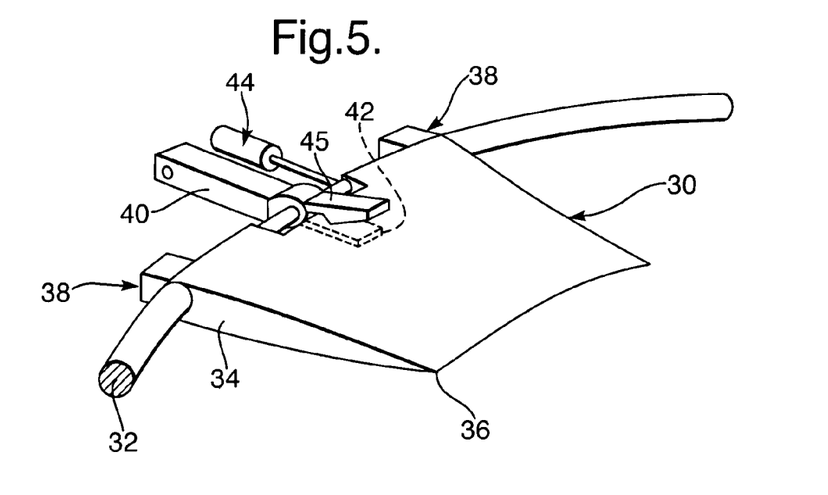
FIG. 5 is a perspective view of another embodiment of the guide member.

Referring to FIG. 5, a minimum area stop member 42 is provided on the radially inner side of each guide member 30 and prevents movement of the respective guide member 30 beyond a first position, as shown in broken lines in FIG. 5, to limit the minimum nozzle exit area. A respective damping arrangement 44 is provided on the torsion bar in the region of at least some of the guide members 30 to ensure that movement of the guide member 30 occurs at the desired rate. A maximum area stop member 45 is provided on the radially outer side of each guide member 30 and prevents movement of the respective guide member 30 beyond a second position, as shown in solid lines in FIG. 5, to limit the maximum nozzle exit area.

When the engine 10 is in operation, the pressures inside the respective inner and outer nozzles 22, 24, at the regions marked A in FIG. 2 are greater than the pressures outside the nozzles 22, 24, at the regions marked B. As a result there is a net pressure force F2 on the guide members 30 as a result of the pressure differences. It will be appreciated that the pressure force F2 on the guide members 30 of the outer fluid flow control device 26 is different to the pressure force F2 or the guide members 30 of the inner fluid flow control device 28.

Similarly, the urging force F1 on the guide members 30 of the outer fluid flow control device 26 are different to the urging force F1 on the guide members 30 of the inner fluid flow control device 28.

Figure 9A:
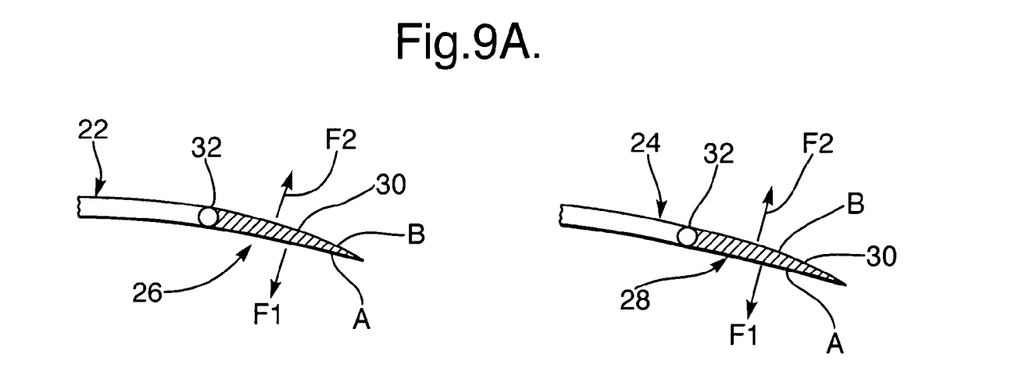
FIG. 9A shows the guide members on a gas turbine engine in a first condition.
Figure 9B:
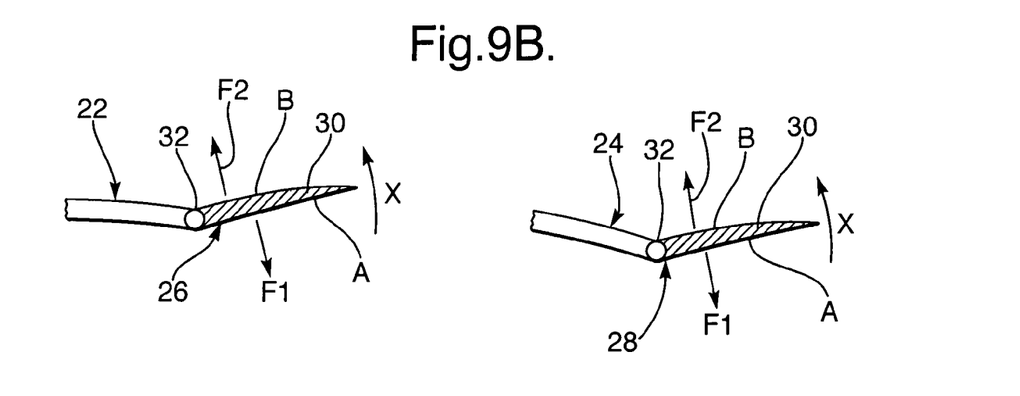
FIG. 9B show the guide members in the gas turbine engine in a second condition.

When the engine 10 is running at a cruise condition, then the urging forces F1 are greater than the pressure forces F2 and there is a net force urging the guide members 30 to the minimum area, or closed, positions shown in FIGS. 2, 5 and 9A, where the guide members 30 engage the minimum area stop member 42.

As the speed of the engine 10 increases, for example at take-off, the pressure differences between the inner and outer regions A and B increases out and the net pressure forces F2 on the guide members 30 increases. As the pressure forces F2 increase, they will eventually exceed the urging forces F1 and the net forces on the guide members 30 will be in the direction indicated by the arrows X in FIG. 9B towards their maximum area, or fully open, position, where the guide members engage the maximum area stop members 45.

The torsion bars 32 have the property that the urging forces exerted thereby increase as the torsion bars are twisted away from their relaxed condition. Thus, as the torsion bars are urged in the directions of the arrows X, the urging forces F1 increase until the forces F1 equal the forces F2. As a result, the guide members 30 can be held in any position between the maximum area positions shown in FIG. 9A and the minimum area positions shown in FIG. 9B.

It will be appreciated that the properties and the materials of the torsion bars 32 used for the inner and outer adjustment arrangements 26, 28 respectively will need to be different from each other and for different engines. It will be a simple matter for those skilled in the art to calculate the exact nature of the respective torsion bars 32 to be used.

In one arrangement, the torsion bar is pre-stressed to bias it to one of the first or second positions. It is desirable to pre-stress the torsion bar to the maximum nozzle area position so that in the event of mechanical failure the maximum nozzle area, required at least for take-off, is available. Alternatively, it is preferable to pre-stress the torsion bar to the minimum nozzle area position to ensure efficiency during cruise.

In one embodiment the torsion bar comprises a Shape Memory Material (SMM) such that its Young's modulus change, at its temperature transition point, assists the pressure differential change to move the guide members 30 between their first and second positions. The torsion bar will still be pre-stressed to the first position. The SMM properties can be manipulated such that the transition point coincides with a desired altitude, for example, so that the torsion bar deforms to the second position at and above that altitude, for example where jet noise is no longer problematic. When the aircraft drops below the transition altitude the SMM torsion bar deforms back to its original configuration in the first position. Alternatively the torsion bar may be pre-stressed to the second position and transition to the first position at the desired altitude. Another parameter may be used instead of altitude. The SMM may comprise a Shape Memory Alloy as known in the art.

It should be apparent to the skilled reader that the SMM may be temperature controlled by supplying heat from a source such as electrical heating wires or from a dedicated hot air ducting, e.g. from the IP or HP compressors. The SMM torsion bar may comprise a solid bar or a hollow tube. The latter is particularly advantageous when controlled using hot air ducting since it becomes its own duct.

Selective temperature changes to the SMM provides assistance to gas loading to move the guide members 30. Advantageously, the stiffness of the torsion bar 32 changes above and below the temperature transition point of the SMM, therefore enabling the gas loads to move the members 30 more easily at certain conditions.

Figure 6:
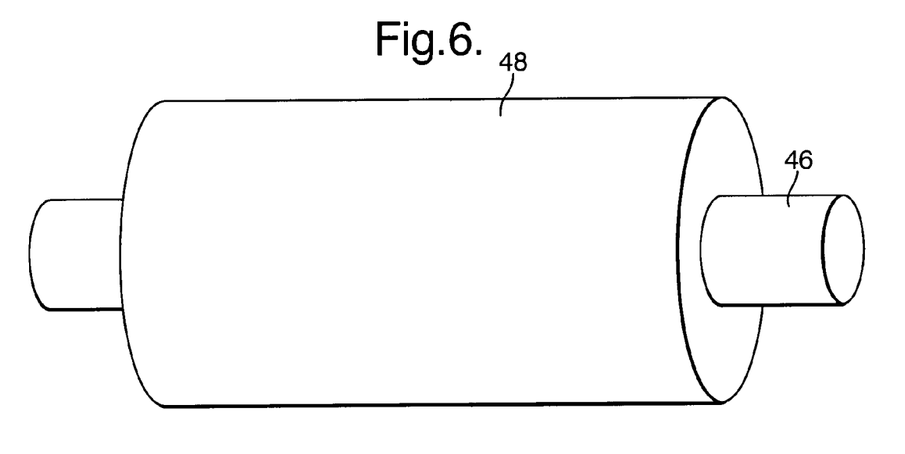
FIG. 6 is a partial perspective view of one embodiment of a torsion bar according to the present invention.

A further embodiment of the torsion bar is shown in FIG. 6 wherein the torsion bar 32 comprises a first material core 46 surrounded by an SMM 48 such that the first material 46 and the SMM 48 are coaxially arranged. The two materials 46, 48 are pre-stressed in opposition to each other so that when the transition point is crossed, the SMM 48 rotates the attached guide members 30 (not shown for clarity) to their deployed positions. The first material 46 acts to assist the return of the arrangement to the non-deployed position when the transition point is crossed in the opposite direction thereby negating any hysteresis effects. This arrangement is advantageous because the first material 46 experiences lower stresses than the SMM 48, in accordance with their capacity to be stressed. It may also be possible to remove at least one of the stop members 42, 45 due to the first material 46 and the SMM 48 acting in opposition to each other.

Figure 7:
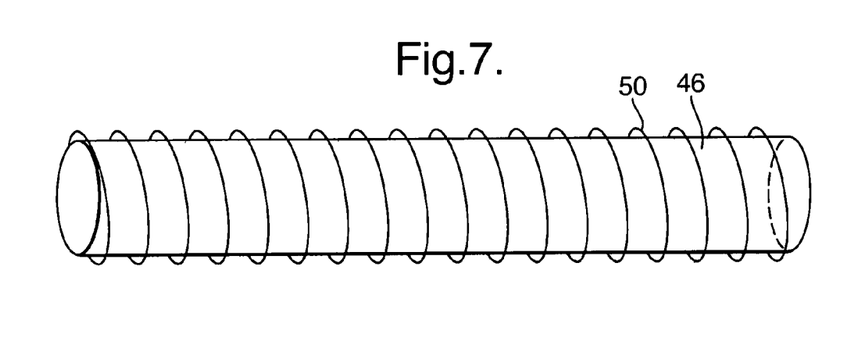
FIG. 7 is a partial perspective view of another embodiment of a torsion bar according to the present invention.

Yet a further embodiment of the torsion bar is shown in FIG. 7 wherein the torsion bar 32 comprises a first material core 46 with a strip or wire 50 of SMM wound around the core 46 to form a helix or coil. This arrangement provides for less stress in the torsion bar 32. A further advantage can be realised by designing the coils of SMM 50 to be coil bound when the guide members 30 are in the deployed position so that the SMM 50 coil itself performs the function of an end stop. Alternatively, the SMM coils 50 may be designed to be coil bound when the guide members 30 are in the non-deployed position.

Figure 8A:
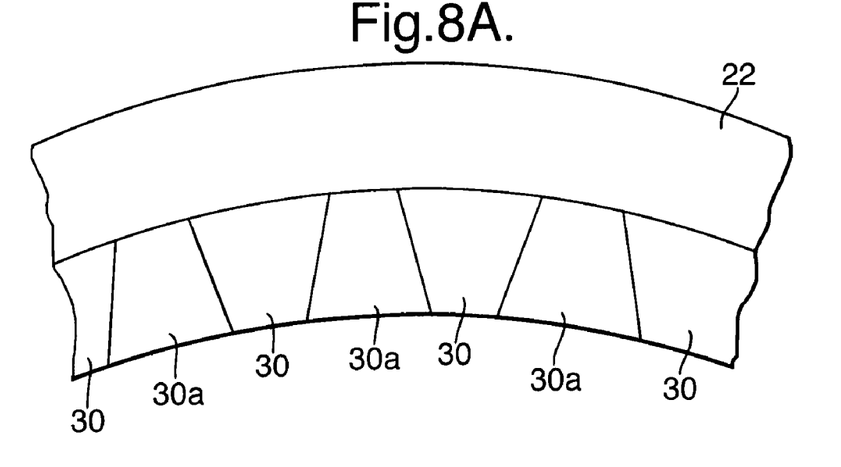
FIGS. 8A and 8B are a schematic perspective views, in the direction of arrow V in FIG. 2, of another embodiment of the guide members in a first condition.
Figure 8B:
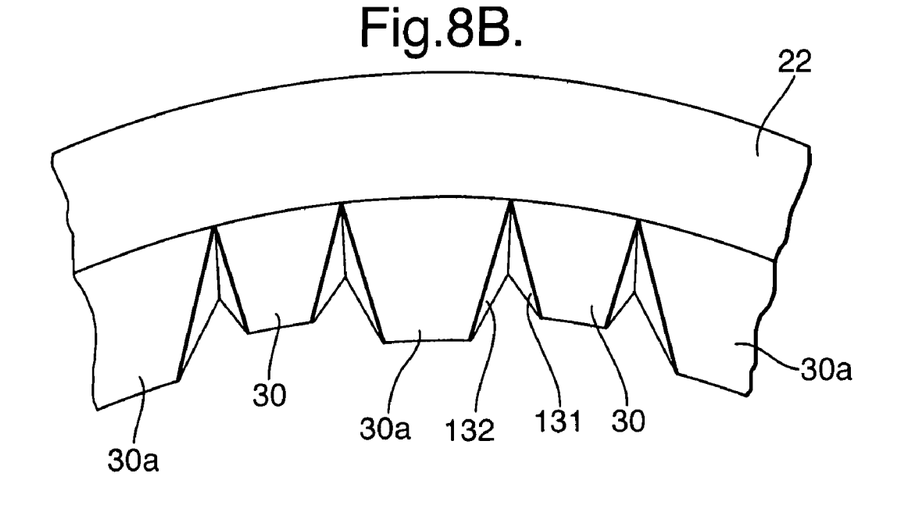

FIGS. 8A and 8B are schematic perspective diagrams of some of the plurality of guide members 30 in an alternative arrangement to FIG. 5. This alternative arrangement comprised fixed and moveable guide members 30a, 30 alternately spaced to one another. Adjacent guide members 30, 30a are shaped to abut at their lateral edges 131, 132 to provide a stop function without requiring the separate stop members 42, 45 of FIG. 5. Alternate guide members 30a are fixed in their alignment whilst the other guide members 30 are free to move between the first and second positions as previously described. Hence, when the guide members 30 move from the second, open position (FIG. 8B) to the first, closed position (FIG. 8A) the angled abutting edges 131, 132 of the guide members 30, 30a act as the stop member.

This arrangement is advantageous as the moveable guide members 30 will form a smooth airwash surface on the nozzle, particularly useful to minimise drag at cruise. A stop member may be added to provide a positive and known rotation into the deployed/second position.

There is thus described a simple and effective adjustment arrangement for adjusting the areas of the inner and outer nozzles 22, 24 for different conditions of operation of the engine 10.

Figure 10:
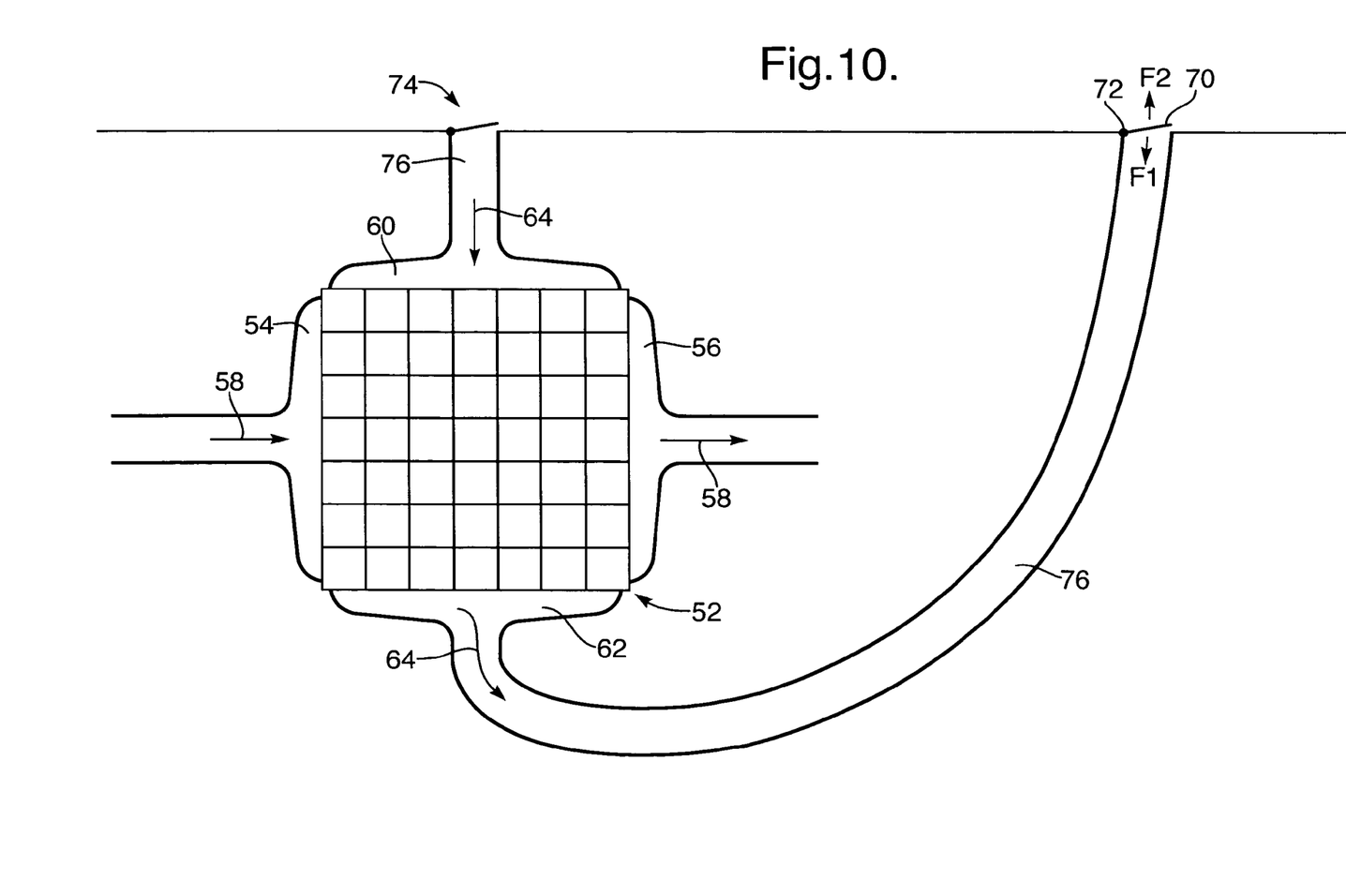
FIG. 10 is a schematic drawing of a heat exchanger incorporating adjustment arrangements according to the present invention.

The present invention has hereinbefore been described with reference to the nozzle or nozzles of a gas turbine engine. However, FIG. 10 shows a further application of the fluid flow control device to control flow through a heat exchanger 52 within a gas turbine engine 10. The heat exchanger 52 comprises a first inlet 54 in fluid communication with a first outlet 56 through which flows a first fluid as indicated by arrows 58. The heat exchanger 52 also comprises a second inlet 60 in fluid communication with a second outlet 62 through which flows a second fluid as indicated by arrows 64. In use, heat exchange occurs between the first and second fluid flows 58, 64 within the heat exchanger 52. For example, the first flow 58 may be extracted from a compressor stage 13, 14 and the second flow 64 be extracted from the bypass duct 21 so that the first flow 58 is cooled by its proximity with the second, cooler flow 64.

The second inlet 60 and second outlet 62 are shown in FIG. 10 in fluid communication with a duct 66, for example the bypass duct 8. A first fluid flow control device 68 according to the present invention is provided at the junction of the second outlet 62 and the duct 66. This comprises a door 70 attached to a torsion bar 72 and is operable in the same manner as previously described with reference to other embodiments of the present invention. Thus there is a pressure difference between the two sides of the door 70 which provides a pressure force F2. The torsion bar 72 is pre-stressed to provide an urging force F1 which opposes the pressure force F2. Thus, when the pressure of the second flow 64 is greater than that in the flow through the duct 66, the pressure force F2 is greater than the urging force F1 and the door 70 is moved to an open position in which the flow is relatively unrestricted. Conversely, when the pressure of the second flow 64 decreases below a predetermined value the pressure force F2 is less than the urging force F1 and the door 70 is moved to a closed position in which the flow is relatively restricted or blocked.

A second fluid flow control device 74 may be provided at the junction of the second inlet 60 and the duct 66. This would act in the same manner as the first fluid flow control device 68; hence the two fluid flow control devices 68, 74 would move in approximate synchronicity.

Although the second flow 64 has been described in fluid communication with the duct 66 and controlled by fluid flow control devices 68, 74 according to the present invention, the first flow 58 could be in fluid communication with the duct 66 instead. The fluid flow control device may be provided on any one or combination of the inlets and outlets of the heat exchanger 52. Other modifications will be obvious to the skilled reader.

Although the present invention is described as providing an fluid flow control device for the exhaust nozzles of gas turbine engines to improve fuel consumption and engine efficiency, it can equally provide noise reduction benefits by the careful selection of guide member shape and size. GB/2,374,121/B of the present Applicant provides guide members or tabs that are deployable for noise reduction purposes. The teachings of GB 2,374,121 B are hereby incorporated by reference. The present invention provides a novel actuation method which has particular advantages in reducing the complexity and weight of the noise reduction fluid flow control device over prior assemblies.

Various modifications can be made without departing from the scope of the invention. Although the above embodiments relate to a three shaft gas turbine engine, it will be appreciated that embodiments of the invention could be used on a two shaft gas turbine engine.

The invention claimed is:

1. A gas turbine engine comprising:
   a nozzle through which a fluid can flow, the nozzle having an outlet, and
   a fluid flow control device arranged on the nozzle at the outlet, the fluid flow control device comprising:
      a guide member to guide the fluid passing through the nozzle, the guide member being movable between first and second positions; and
      an resilient torsion bar, the resilient torsion bar being mounted to the guide member and being pre-stressed to provide an urging force to urge the guide member towards the first position and the guide member is moved towards the second position by a pressure force exceeding and opposite to the urging force, the pressure force being provided by a pressure difference across the guide member.

2. A gas turbine engine according to claim 1 wherein the resilient torsion bar is generally annular in configuration to extend around the nozzle.

3. A gas turbine engine according to claim 2 comprising an assembly that comprises a plurality of the guide members arranged adjacent one another around the resilient torsion bar.

4. A gas turbine engine according to claim 1 wherein the resilient torsion bar comprises a plurality of resilient torsion bars arranged one after another in an annular arrangement.

5. A gas turbine engine according to claim 4 wherein each resilient torsion bar has a discrete guide member mounted thereon.

6. A gas turbine engine according to claim 1 wherein the first position of the guide member provides a minimum area condition for a fluid path, and the second position of the guide member provides a maximum area of condition for the fluid path.

7. A gas turbine engine according to claim 1 wherein the guide member comprises a tapering member tapering from a wide region adjacent the resilient torsion bar, to a narrow region spaced from the resilient torsion bar.

8. A gas turbine engine according to claim 1 wherein a securing arrangement is provided to secure the guide member to the resilient torsion bar.

9. A gas turbine engine according to claim 8 wherein the securing arrangement comprises a clamp.

10. A gas turbine engine according to claim 8 wherein the securing arrangement comprises a first clamp and a second clamp.

11. A gas turbine engine according to claim 1 further comprising:
    a fixing element that is provided to fix the fluid flow control device to the nozzle, the fixing element extending in an upstream direction from the resilient torsion bar fixing to the nozzle.

12. A gas turbine engine according to claim 1 wherein a first stop is provided to restrict the extent of movement of the guide member when urged towards the first position and to provide a minimum area of the nozzle, and a second stop is provided to restrict the extent of travel of the guide member when being urged towards the second position, and to provide a maximum area of the nozzle.

13. A gas turbine engine according to claim 1 wherein a damping arrangement is provided to inhibit a speed at which the guide member moves between the first and second positions.

14. A gas turbine engine according to claim 1 wherein the resilient torsion bar comprises a Shape Memory Material.

15. A gas turbine engine according to claim 1 comprising an assembly that comprises fixed and moveable guide members.

16. A gas turbine engine fluid flow control according to claim 15 wherein the fixed and moveable guide members are alternately spaced apart.

17. A gas turbine engine according to claim 15 wherein the guide members have lateral edges that are angled to abut one another to provide positive location in the first or second position.

18. A gas turbine engine according to claim 1 further comprising a plurality of guide members arranged circumferentially around the outlet of the nozzle, each guide member being mounted on a common resilient torsion bar, the common resilient torsion bar extending around the nozzle.

19. A gas turbine engine according to claim 1 comprising a plurality of guide members arranged adjacent one another around the resilient torsion bar, the nozzle arrangement comprising a plurality of discrete guide members arranged on respective discrete resilient torsion bars.

20. A gas turbine engine according to claim 19 wherein the plurality of discrete guide members and the respective discrete resilient torsion bars are circumferentially arranged adjacent one another.

21. A gas turbine engine comprising a fan for directing a first flow of air through a first nozzle, and a turbine arrangement for directing a second flow of air through a second nozzle, a first fluid flow control device as claimed in claim 1 provided on the first nozzle, and a second fluid flow control device as claimed in claim 1 provided on the second nozzle.

22. A gas turbine engine comprising:
    a nozzle that has an outlet;
    a fluid flow control device arranged on the nozzle at the outlet; the fluid flow control device comprising:
       a guide member to guide the fluid passing through the nozzle, the guide member being movable between first and second positions; and
       a resilient torsion bar that is mounted to the nozzle, the resilient torsion bar being pre-stressed to provide an urging force to urge the guide member towards the first position, wherein the guide member is moved towards the second position by a pressure force exceeding and opposite to the urging force, the pressure force being provided by a pressure difference across the guide member.

23. A gas turbine engine according to claim 1, further comprising:
a clamping arrangement, wherein the guide member being mounted to the resilient torsion bar with the clamping arrangement.

24. A gas turbine engine according to claim 1, further comprising:
a plurality of guide members that are circumferentially mounted on the resilient torsion bar.

25. A gas turbine engine according to claim 22, further comprising:
a clamping arrangement, wherein the guide member being mounted to the resilient torsion bar with the clamping arrangement.

26. A gas turbine engine according to claim 22, further comprising:
a plurality of guide members that are circumferentially mounted on the resilient torsion bar.

* * * * *